United States Patent [19]

Tung

[11] 4,394,490
[45] Jul. 19, 1983

[54] WATER DISPERSIBLE POLYESTER COMPOSITIONS

[75] Inventor: William C. T. Tung, Tallmadge, Ohio

[73] Assignee: The Goodyear Tire & Rubber Company, Akron, Ohio

[21] Appl. No.: 425,146

[22] Filed: Sep. 28, 1982

[51] Int. Cl.³ .................... C08F 283/00; C08G 63/76; C08L 63/00
[52] U.S. Cl. .................... 525/438; 525/443; 528/288; 528/289; 528/293; 528/296
[58] Field of Search .............. 528/288, 289, 293, 296; 525/438, 443

[56] References Cited

U.S. PATENT DOCUMENTS

| | | | |
|---|---|---|---|
| 4,088,619 | 5/1978 | Holzrichter | 525/443 X |
| 4,102,867 | 7/1978 | Penton et al. | 528/289 |
| 4,130,520 | 12/1978 | Thomas et al. | 525/443 X |
| 4,150,217 | 4/1979 | Noonan et al. | 528/293 X |
| 4,180,612 | 12/1979 | Pauzë et al. | 528/289 |
| 4,291,153 | 9/1981 | Noonan et al. | 528/293 X |
| 4,309,529 | 1/1982 | Wendling | 528/289 |

Primary Examiner—Lucille M. Phynes
Attorney, Agent, or Firm—Daniel J. Hudak; Bruce Hendricks

[57] ABSTRACT

Water soluble polyester compositions which, upon cure, are water insoluble. These water-based polyesters are made utilizing hydantoin compounds with salts of a compound containing a sulfo acid group therein. Such compositions are useful as coatings, paints, and the like and eliminate any recovery problems or toxicity problems normally related with many organic solvents.

10 Claims, No Drawings

WATER DISPERSIBLE POLYESTER COMPOSITIONS

TECHNICAL FIELD

The present invention relates to water soluble polyester compositions which, upon cure, are water insoluble.

BACKGROUND ART

Heretofore, various compositions have been water dispersible. For example, U.S. Pat. No. 3,428,586 relates to a water dispersible resin which contains natural drying oil therein. However, this patent is not pertinent in that it does not relate to a polyester resin, and does not contain any salt of a sulfo dialkyl isophthalate or hydantoin compound therein.

U.S. Pat. No. 4,104,264, while relating to a water dispersible polyester resin, lacks any suggestion of containing hydantoin groups within the polymer chain and hence is not pertinent.

U.S. Pat. No. 4,179,420, while relating to water dispersible polyesters which can be formed utilizing anhydrides, does not contain any sulfo salts therein as well as any hydantoin compounds therein.

U.S. Pat. No. 4,304,900 and 4,304,901 relate to linear water dissipatible polyesters and polyester amides utilizing a disulfonamido compound and a sulfonic acid salt moiety, respectively, and do not contain any amounts of a hydantoin compound.

British Pat. No. 1,461,037, while relating to an aqueous insulating polyester varnish made from aromatic tricarboxylic acids, is not pertinent in that it lacks a sulphonate salt as well as a hydantoin compound, whereas British Pat. No. 1,546,477 lacks any suggestion of the hydantoin compound.

DISCLOSURE OF INVENTION

It is therefore an aspect of the present invention to provide a water soluble polyester composition.

It is yet another aspect of the present invention to provide a water soluble polyester composition, as above, containing hydantoin groups therein.

It is a further aspect of the present invention to provide a water soluble polyester composition, as above, in which said polyester composition has a low molecular weight.

It is still another aspect of the present invention to provide a water soluble polyester composition, as above, wherein the intrinsic viscosity of said polyester composition ranges from about 0.15 to about 0.3 dl/g.

It is a still further aspect of the present invention to provide a water soluble polyester composition as above, wherein said polyester composition contains alkali salts of a sulfo dimethyl isophthalate.

It is an additional aspect of the present invention to provide a water soluble polyester composition, as above, wherein said polyester composition is insoluble in water upon cure.

It is an additional aspect of the present invention to provide a water soluble polyester composition, as above, wherein said polyester composition is suitable as a coating or a paint.

These and other aspects of the present invention will be better understood by the following specification which describes in detail the present invention.

In general, a water dispersible polyester, comprises: a polyester, said polyester comprising a mixture of units in the polymer chain made from the reaction product of a diacid component and a diol, said diacid component comprising up to 30 mole percent by weight of a compound selected from the group consisting of an alkyl dicarboxylic acid having from 4 to 20 carbon atoms, a diester of an alkyl dicarboxylic acid having from 6 to 20 carbon atoms, and combinations thereof, at least 70 mole percent of an aromatic dicarboxylic acid or ester thereof selected from the group consisting of an aryl dicarboxylic acid having from 8 to 20 carbon atoms, an alkyl substituted aryl dicarboxylic acid having from 9 to 20 carbon atoms, a diester of an alkyl substituted aryl dicarboxylic having from 11 to 20 carbon atoms, a diester of an aryl dicarboxylic acid having from 10 to 20 carbon atoms, and combinations thereof, said diol comprising up to 30 mole percent of a diol selected from the group consisting of a glycol having from 2 to 12 carbon atoms, a glycol ether having from 4 to 12 carbon atoms, or combinations thereof, said diol component also having at least 70 mole percent of a hydantoin compound having the formula

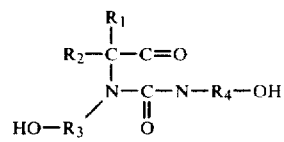

wherein $R_1$ and $R_2$ can be the same or different and is an alkyl having from 1 to 2 carbon atoms, and where $R_3$ and $R_4$ can be the same or different and is an alkyl having from 1 to 4 carbon atoms.

BEST MODE FOR CARRYING OUT THE INVENTION

Water soluble polyester compositions are formed according to the present invention by the reaction of dicarboxylic acids, or esters thereof, with various diol type compounds. An important aspect of the present invention is that a substantial amount of the diol type compounds is a hydantoin having the following structural formula

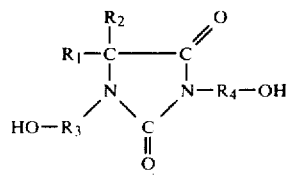

wherein $R_1$ and $R_2$ are alkyl groups and can be the same or different and have from 1 to 2 carbon atoms, with methyl groups being preferred. $R_3$ and $R_4$ are alkyl groups and can be the same or different and can contain from 1 to 4 carbon atoms, with ethyl groups being preferred. Hence, a preferred hydantoin compound is Di(2-hydroxyethyl)dimethylhydantoin. The minimum amount of the hydantoin compound utilized, based upon the total amount of the diols, is at least 70 mole percent with 80 mole percent or greater being preferred. With regard to the remaining diols, which constitute 30 mole percent or less, preferably 20 mole percent or less, glycols containing from 2 to 12 carbon atoms, desirably from 2 to 8 and preferably ethylene glycol is preferred. Another class of the diols is the glycol ethers such as those having from 4 to 12 carbon atoms, with 4 to 8 carbon atoms being preferred. A specific example of such a glycol ether is diethylene glycol ether.

The diols are reacted with dicarboxylic acids, or diesters thereof, along with up to a maximum of about 20 mole percent of a sulfo-containing compound, based upon the total amount of acids, to produce the water-soluble polyester compositions of the present invention. Generally, the diacids contain a total of from 4 to 20 carbon atoms and one or more of different acids can be utilized.

Alkyl dicarboxylic acids containing from 4 to 20 and preferably from 4 to 12 carbon atoms may be utilized such as glutaric acid, adipic acid, pimelic acid, and the like. The various diesters of the dialkyl dicarboxylic acids having from 6 to 20 and preferably from 6 to 12 carbon atoms can also be utilized. Examples of alkyl diesters include those made from azelaic acid, and the like.

Aryl dicarboxylic acids containing from 8 to 20; desirably from 8 to 16, as well as alkyl substituted aryl dicarboxylic acids containing from 9 to 20 and preferably from 9 to 16 carbon atoms can also be utilized. Examples of aryl acids include terephthalic, orthophthalic acid, naphthalic acid, for example, 2,6-naphthalene dicarboxylic acid, and the like. Moreover, isophthalic acid can be utilized. However, terephthalic acid is highly preferred. Specific examples of alkyl substituted aryl acids include the various isomers of phthalic acid such as isophthalic acid, and terephthalic acid.

In lieu of the various aryl dicarboxylic acids, whether or not substituted, the various diesters thereof can also be utilized such as those containing from 10 to 20 carbon atoms and preferably from 10 to 14 carbon atoms. Specific examples include dimethylphthalate such as dimethylterephthalate, a preferred ester, the various isomers of diethylphthalate, the various isomers of diethylnaphthalate, and the like, additionally, diesters of alkyl substituted aryl dicarboxylic acids having from 11 to 20 and preferably from 11 to 15 carbon atoms.

In preparing the water soluble polyester compositions, only up to 30 mole percent of the alkyl dicarboxylic acids or diesters thereof are utilized. Thus, the aromatic acids or esters, that is the aryl dicarboxylic acids, the alkyl substituted aryl dicarboxylic acids, or diesters of either aryl dicarboxylic acids or alkyl substituted aryl dicarboxylic acids exist in an amount of at least 70 mole percent and often 100 mole percent with regard to the total amount of acids utilized.

The mole ratio of the total amount of diols charged including the hydantoin compounds to the total amount of acids generally ranges from at least 1.0 to about 2.2, and preferably from 1.5 to about 2.2. In other words, the excess of the total amount of diols utilized to the total amount of acids or esters thereof is generally approximately 2. In addition to acting as a glycol, the hydantoin compound also aids in acting as a solubility agent to promote solubility of the formed polyester in water.

The sulfo containing compound which promotes resin or polymer solubility are alkali salts of sulfo alkyl isophthalate wherein the alkyl group can have from 1 to 5 carbon atoms, with methyl being preferred. Although lithium, potassium, etc., salts may be utilized, the sodium salt thereof is preferred. Good polyester composition solubility in water has been obtained by utilizing from about 0.1 to about 20 mole percent and preferably from about 1 to about 10 mole percent of the alkali salt of sulfo alkyl isophthalate based upon the total amount of the acid or ester thereof.

Desirably, low molecular weight polyester compositions are made. That is, they have an intrinsic viscosity of from about 0.15 to about 0.3 dl/g and preferably from about 0.15 to about 0.25 in a 60/40 solution of phenol/-tetrachloroethane solution at 25° C.

The polyester compositions of the present invention can be made in any conventional manner well known to the art. Thus, conventional temperatures, catalysts, amounts of catalysts, stabilizers, and the like, are utilized as known to the art or literature. Moreover, when an acid is utilized, as a starting material in contrast to an ester, the polyester can be made in a manner as set forth in U.S. Pat. No. 4,020,049 to Rinehart, which is hereby fully incorporated with regard to a method of making a polyester.

In order to assit in the solubility of the polyester in water, desirably a high number of carboxyl end groups are added to the polymers. This is desirably achieved by utilizing any acid anhydride having from 4 to about 20 carbon atoms during the $S_3$ stage. That is, the acid anhydride is added after the condensation reaction (the $S_2$ stage) in which a vacuum is gradually applied until a maximum vacuum has been reached, at which point commences the $S_3$ stage, that is the vacuum is held and the condensation continued. Desirably, the anhydride is added at the late $S_3$ stage as from 3.7 to 3.9. Examples of suitable acid anhydrides include trimellitic anhydride, phthalic anhydride, and the like, with trimellitic anhydride being preferred. The amount of the acid anhydride utilized ranges from about 1 to about 30 mole percent and preferably from about 5 to about 25 mole percent based upon the total amount of moles of di- and triacids or esters thereof.

The above polyesters produced water soluble compositions which can be applied to a variety of substrates, and generally are used as paints or coatings. Examples of specific uses include either spray or brush application as to plastic and metal substrates and the like. Various conventional dyes, pigments, and colorants can be utilized in various amounts to impart a desired color to the polyester composition whenever a particular color is desired to be imparted to the object coated or painted.

Although the polyesters of the present invention are water soluble, when cured they form a good water insoluble coating. A particular crosslinking agent is Cymel 300, that is hexamethoxymethyl melamine, a product of American Cyanamid. Generally, any crosslinking compound agent can be used as is well known to those in the art. Generally, the amount will depend upon the carboxyl number of the polyester resin. A suitable class of crosslinking agents includes the various epoxy compounds, as well known to the art, as well as set forth in the literature.

The present invention will be better understood by reference to the following examples.

EXAMPLE 1

Dimethyl terephthalate, 19.4 grams, 5.87 grams of sodium sulfo dimethyl isophthalate, 30.2 grams of dantocol DHE Di(2-hydroxyethyl) dimethyl hydantoin, 15 cc of ethylene glycol, 0.1 gram of zinc acetate, 0.1 grams of manganese acetate, and 0.1 gram of antimony trioxide were charged in a glass reactor, and polymerized in a conventional manner. When the I.V. reached 0.117, 6.4 grams of trimellitic anhydride was added and the mixture stirred for 15 minutes at 160 mm Hg at 250°

C. The resultant polymer was light brown in color and brittle. This polymer was ground and made into a 33 percent aqueous dispersion. The result is a stable dispersion, which is milky in appearance.

Then, 0.5 gram of Cymel 300 (hexamethoxymethyl melamine, a product of American Cyanamid) was added into 10 ml of the above dispersion. The mixture was coated on a clean steel plate and cured at 125° C. for 15 minutes. A good water insoluble coating was formed.

EXAMPLE 2

In a manner similar to Example 1, a polyester resin was made from the following formulation:

21.4 grams: dimethyl terephthalate
2.34 grams: sodium sulfo dimethyl isophthalate
25.2 grams: Dantocol DHE
15.0 ml: ethylene glycol
0.1 gram: zinc acetate
0.1 gram: antimony trioxide.

When 14 cc of ethylene glycol was collected, 6.4 grams of trimellitic anhydride was added. The stirring was continued for 15 minutes and the sample was discharged. The solidified polymer had an I.V. of 0.179 and melting point of 133° C. It did not dissolve in water, however, it is soluble in diluted $NH_4OH$.

As apparent from the above examples, the water soluble resins of the present invention upon curing formed an insoluble coating in water.

While in accordance with the patent statutes, the best mode and preferred embodiments have been set forth and described in detail, it will be apparent to those skilled in the art that various changes and modifications thereof can be made without departing from the spirit or scope of the invention. Accordingly, the invention is measured by the scope of the attached claims.

What is claimed is:

1. A water dispersible polyester, comprising:
   a polyester, said polyester comprising a mixture of units in the polymer chain made from the reaction product of a diacid component and a diol,
   said diacid component comprising up to 30 mole percent by weight of a compound selected from the group consisting of an alkyl dicarboxylic acid having from 4 to 20 carbon atoms, a diester of an alkyl dicarboxylic acid having from 6 to 20 carbon atoms, and combinations thereof, at least 70 mole percent of an aromatic dicarboxylic acid or ester thereof selected from the group consisting of an aryl dicarboxylic acid having from 8 to 20 carbon atoms, an alkyl substituted aryl dicarboxylic acid having from 9 to 20 carbon atoms, a diester of an alkyl substituted aryl dicarboxylic acid having from 11 to 20 carbon atoms, a diester of an aryl dicarboxylic acid having from 10 to 20 carbon atoms, and combinations thereof;
   said diol comprising up to 30 mole percent of a diol selected from the group consisting of a glycol having from 2 to 12 carbon atoms, a glycol ether having from 4 to 12 carbon atoms, or combinations thereof, said diol component also having at least 70 mole percent of
   a hydantoin compound having the formula

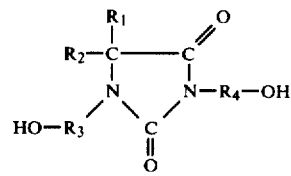

wherein $R_1$ and $R_2$ can be the same or different and is an alkyl having from 1 to 2 carbon atoms, and where $R_3$ and $R_4$ can be the same or different and is an alkyl having from 1 to 4 carbon atoms.

2. A water dispersible polyester according to claim 1, including reacting from about 0.1 to about 10 mole percent of an alkali salt of a sulfo alkyl isophthalate based upon the total amount of said acid or diester, said alkyl having from 1 to 5 carbon atoms, said polymer chain containing units of said sulfo compound therein.

3. A water dispersible polyester according to claim 2, wherein said alkyl dicarboxylic acid has from 4 to 12 carbon atoms, wherein said diester of said alkyl dicarboxylic acid has from 6 to 12 carbon atoms, wherein said aryl dicarboxylic acid has from 8 to 16 carbon atoms, wherein said alkyl substituted aryl dicarboxylic acid has from 9 to 16 carbon atoms, wherein said diester of said alkyl substituted aryl dicarboxylic acid has from 11 to 15 carbon atoms, wherein said diester of said aryl dicarboxylic acid has from 10 to 14 carbon atoms,
   wherein said glycol has from 2 to 8 carbon atoms, wherein said glycol ether has from 4 to 8 carbon atoms, wherein said $R_1$ and $R_2$ of said hydantoin compound is methyl, and wherein $R_3$ and $R_4$, of said hydantoin compound is ethyl.

4. A water dispersible polyester according to claim 3, wherein said acid is terephthalic acid or isophthalic acid, wherein said ester is dimethylterephthalate or dimethyl isophthalate, and wherein said diol is ethylene glycol.

5. A water dispersible polyester according to claim 4, including reacting during third stage of the reaction from about 1 to about 30 mole percent of an acid anhydride having from 4 to 20 carbon atoms based upon the total amount of said acid or diester thereof.

6. A water dispersible polyester according to claim 5, wherein the amount of said hydantoin compound is at least 80 mole percent based upon the total amount of said diols, and wherein the intrinsic viscosity of said polyester ranges from about 0.15 to about 0.3 dl/g in a 60/40 solution of phenol/tetrachloroethane.

7. A water dispersible polyester according to claim 6, wherein said sulfo salt compound is the sodium salt of sulfo dimethyl isophthalate in an amount ranging from about 1 to about 10 mole percent wherein said hydantoin compound is Di(2-hydroxyethyl) dimethylhydantion, and wherein said acid anhydride is phthalic anhydride or trimellitic anhydride, wherein said addition of said anhydride is from about S3.7 to S3.9, and wherein said amount of said anhydride added is from about 5 to about 25 mole percent.

8. A water dispersible polyester according to claim 1, 2, 4, 5, or 7, wherein said dispersible polyester has been cured by a curing agent, so that said polyester is water insoluble.

9. A water dispersible polyester according to claim 8, wherein said curing agent is an epoxy compound.

10. A water dispersible polyester according to claim 8, wherein said curing agent is hexamethoxymethyl melamine.

* * * * *